United States Patent Office 3,028,093
Patented Apr. 3, 1962

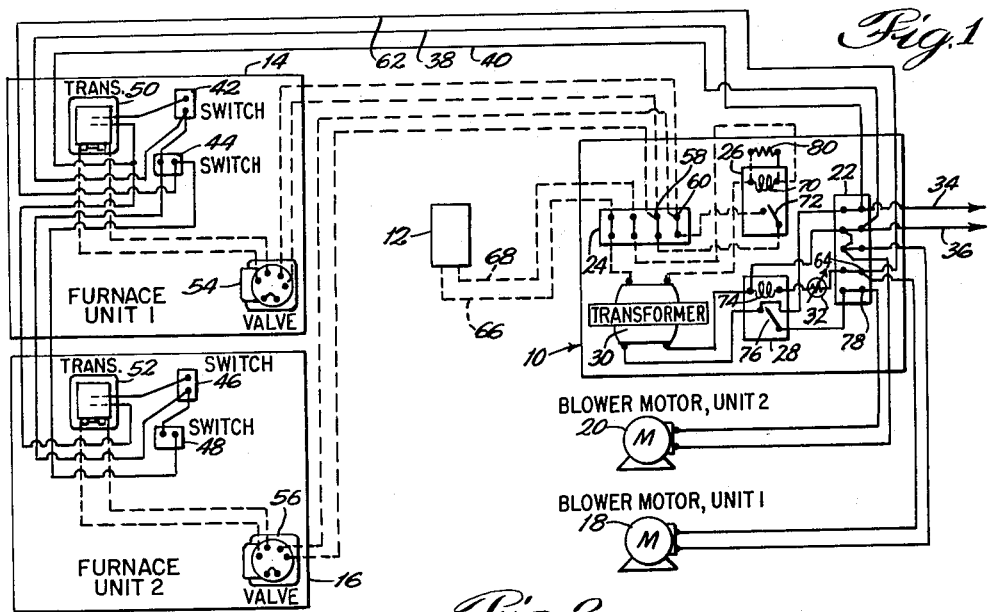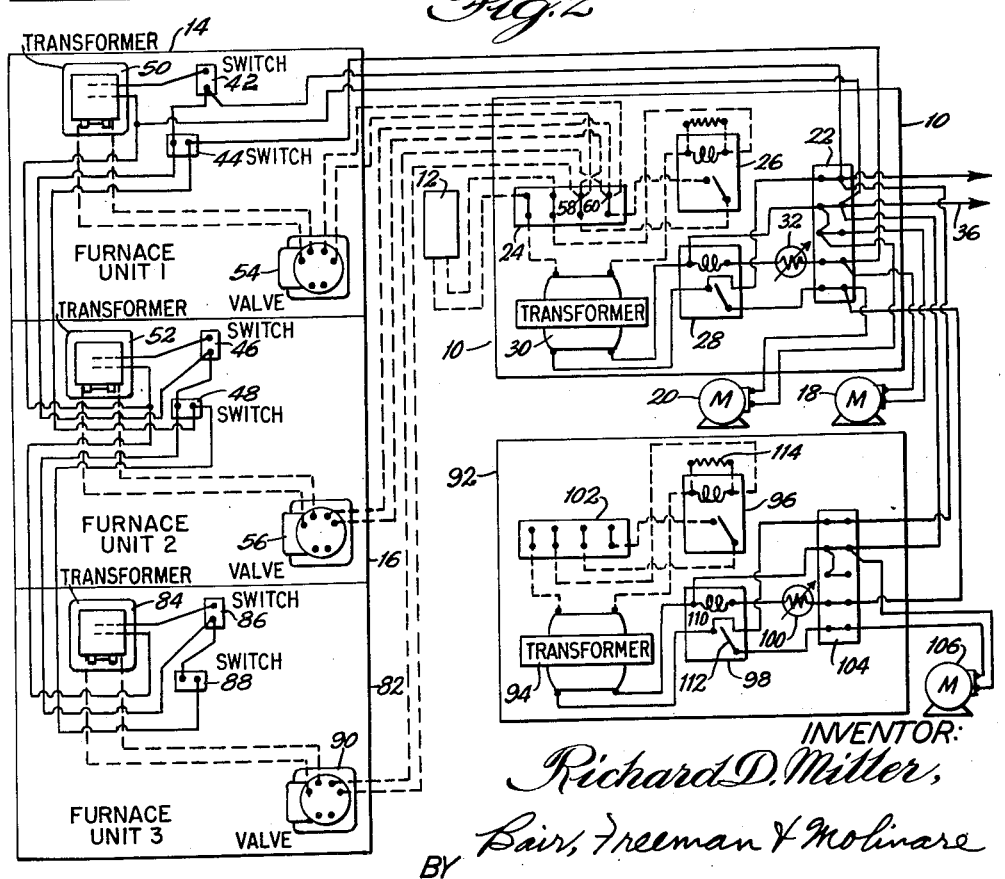

3,028,093
MULTIPLE INTERLOCK CONTROL CIRCUIT FOR PLURAL FURNACE UNITS
Richard D. Miller, Marshalltown, Iowa, assignor to Lennox Industries, Inc., a corporation of Iowa
Filed July 20, 1959, Ser. No. 828,268
3 Claims. (Cl. 236—1)

This invention relates generally to electrical control circuits for air heating and cooling equipment, and more particularly to multiple interlock control circuitry for coordinating the control of a plurality of blower motors and heating or cooling units in air processing equipment.

Those skilled in the art understand that present day air processing equipment generally comprises the combination of a blower motor, an air processing unit for heating or cooling the air—in all season air processing equipment there is provision for both heating and cooling—and temperature responsive control equipment for controlling the operation of the blower and an air processing unit in accordance with temperature changes to maintain a desired temperature within the area affected by the equipment. Where greater capacity equipment is required, as in larger homes and in commercial and industrial users, multiple air processing units advantageously may be used but the use of two or more units has presented certain problems in the control of the heating or cooling circuits from a single controller such as a thermostat, and in the control of the several blower motors in the units to prevent sudden heavy demands on the power source.

Accordingly, it is a general object of this invention to provide a new and improved multiple interlock control circuit for controlling the operation of plural air processing units and blower motors in air processing equipment.

More particularly, it is one object of this invention to provide an improved multiple interlock control circuit for use with a plurality of air heating or cooling units which coordinates the operation of such units from a single thermostat.

It is another object of this invention to provide such an improved multiple interlock control circuit for use with a plurality of blower motors in multiple unit air processing equipment which sequences the starting of the blower motors to prevent sudden heavy demands upon the power source when the fan control of one of the multiple air processing units signals for air.

It is still another object of this invention to provide an improved multiple interlock control circuit, as described above, which may be utilized singly to control the operation of two air heating or cooling units, or which may be used in pairs to control the operation of three air heating or cooling units.

It is a further object of this invention to provide an improved multiple interlock control circuit, as described above, which is characterized by its compact construction, its relative simplicity having merely a few operating components, and its efficiency and flexibility of operation.

The above and other objects are realized in accordance with a specific illustrative embodiment of the invention which will be described as operatively associated with two or more furnace units, although it will readily be understood by those skilled in the art that the principles of the invention advantageously may be utilized in all types of air heating and cooling equipment generally.

In the specific illustrative embodiment of the invention disclosed herein, each multiple interlock control circuit comprises a pair of relays, hereinafter referred to as a heating relay and a blower relay. The heating relay coil is controlled by a single heating thermostat and the contacts of the heating relay are wired to energize the plural burner circuits simultaneously whenever the thermostat signals a heat demand. Those skilled in the art appreciate that two sets of burner controls normally cannot be operated in parallel from a single thermostat without upsetting the heat anticipation feature of the thermostat. In accordance with a specific feature of this invention, a resistance element is provided in parallel with the heating relay coil which serves to adjust the current flow through the thermostat to the value of heat anticipation current so that a single standard thermostat may be used to coordinate the operation of two sets of parallel connected burner controls with proper thermostat heat anticipation.

In accordance with a further feature of this invention, the blower relay in the multiple interlock control circuit controls the operation of the several blower motors in the plurality of furnace units. The fan controls of the furnace units are wired in parallel and the first blower motor will start when any fan control calls for blower operation. At the time the first blower motor starts, power is supplied to the blower relay coil through a suitable delay device, which advantageously may be a thermistor, and the full energization of the blower relay is delayed a predetermined period of time. The circuit arrangement is such that the second blower motor is energized through the contacts of the blower relay and therefore the time delay action of the multiple interlock control circuit steps or sequences the starting of the blower motor to prevent sudden large current demands on the power source.

The above and other features of novelty which characterize the invention are pointed out with particularity in the claims annexed to and forming a part of this specification. For a better understanding of the invention, however, its advantages and specific objects attained with its use, reference is had to the accompanying drawing and descriptive matter in which is shown and described an illustrative embodiment of the invention.

In the drawing:
FIGURE 1 is an illustrative embodiment of a multiple interlock control circuit in accordance with the invention as utilized in controlling two furnace units having separate blower motors from a single thermostat; and FIGURE 2 is another illustrative embodiment of the invention wherein two multiple interlock control circuits are utilized to control three separate furnace units from a single thermostat.

Referring now to the drawing, and more particularly to FIGURE 1, thereof, the novel multiple interlock control circuit 10 is shown as operatively connected to a thermostat 12, a first furnace unit 14, a second furnace unit 16, and the blower motors 18 and 20, respectively, of the first and second furnace units.

In the specific illustrative embodiment of the invention shown in FIGURE 1, the multiple interlock control circuit 10 advantageously comprises a high voltage terminal strip 22, a low voltage terminal strip 24, a heating relay 26, a blower relay 28, a transformer 30, and a negative temperature co-efficient resistor 32, sometimes referred to as a thermistor. A pair of power conductors 34 and 36, which are adapted to be connected to a normal 115 volt A.C. power source, are connected through the high voltage terminal strip 22 to the primary winding of transformer 30. Conductors 34 and 36 also are connected by means of the furnace connecting leads 38 and 40 to the power controls of furnace units 14 and 16. Thus, conductor 38 is connected to a terminal of limit switch 42 and fan switch 44 in furnace unit 14, and also to a terminal of limit switch 46 and fan switch 48 in furnace unit 16. Conductor 40 is connected to a primary winding terminal of transformer 50 in furnace unit 14, and also to a primary winding terminal of transformer 52 in furnace unit 16. The other primary winding terminal of transformer 50 in furnace unit 14 is connected to a second terminal of limit switch 42, and the other primary winding terminal of transformer 52 in furnace unit 16 is connected to the other terminal of limit switch 46. The secondary windings of transformer 50 in the furnace unit 14 are connected to the automatic main control valve 54 of this furnace unit, and the secondary windings of the transformer 52 in furnace unit 16 are connected to the automatic main control valve 56 of this furnace unit.

The output terminals of the automatic main control valves 54 and 56 respectively are connected in common to the terminals 58 and 60 of the low voltage terminal strip 24. The remaining terminals of the fan switches 44 and 48 of furnace units 14 and 16, respectively, are connected in common by the conductor 62 to terminal 64 of the high voltage terminal strip 22.

One terminal of thermostat 12 is connected by conductor 66 through the low voltage terminal strip 24 to a secondary winding terminal of transformer 30. The other terminal of thermostat 12 is connected by conductor 68 through the low voltage terminal strip 24 to one terminal of the heater relay coil 70 of heater relay 26, the other terminal of which is connected to the remaining primary winding terminal of transformer 30. The contacts 72 of heater relay 26 are connected across terminals 58 and 60 of the low voltage terminal strip 24 so that it completes the circuit of the automatic main control valves 54 and 56 in the furnace units 14 and 16 respectively when the contacts 72 are closed by the energization of the heater relay coil 70.

The power conductor 36 is connected, through the terminal strip 22, to one terminal of the blower relay coil 74 of the blower relay 28, the other terminal of which is connected to the thermistor 32. The power conductor 34 is connected to a contact of the blower relay contacts 76, the other contact of which is connected to terminal 78 in the terminal strip 22. The terminals of the blower motor 18 for furnace unit 14 are connected to terminal 64 of terminal strip 22 and, through various terminals of terminal strip 22, to power conductor 36, respectively. The terminals of the blower motor 20 for furnace unit 16 are connected respectively to terminal 78 of terminal strip 22, and through various terminals of terminal strip 22, to power conductor 36.

Operation of the circuit shown in FIGURE 1 can now be fully understood by the following description of its operation. As stated above, it is a unique function of the multiple interlock control circuit 10 to enable control of a pair of furnace units by a single thermostat in response to a heating demand, whereby both furnace units are energized simultaneously, and to sequence the blower motors for the plurality of furnace units such that they are energized one after the other in accordance with a predetermined time pattern so as to avoid the excessive drain which would be placed upon the power source should both blower motors be turned on simultaneously. This highly advantageous operation is effected in accordance with the invention by the novel circuit described above and shown in FIGURE 1 whereby the two separate burner circuits are operated from a single thermostat and whereby the closing of the fan switch in either furnace unit causes blower motor 18 to be turned on, and after a predetermined time delay, causes blower motor 20 to be turned on.

Accordingly, if the thermostat 12 signals a heat demand, a circuit will be closed between the power conductors 34 and 36, the transformer 30, the thermostat 12, and the heating relay coil 70 in the heating relay 26. Energization of heating relay coil 70 closes its contacts 72 thereby completing a circuit for the automatic main control valves 54 and 56 in furnace units 14 and 16, respectively. When the automatic main control valves in the furnace units are operated, in response to the closing of heater contacts 72, the burners in these furnace units are energized simultaneously and in accordance with furnace operation familiar to those skilled in the art, the fan switches 44 and 48 of the furnace units subsequently will be operated.

In accordance with a feature of this invention, the fan switches 44 and 48 are wired in parallel and the blower motor for furnace unit 14—blower motor 18—will be energized when either of the fan switches 44 or 48 calls for blower operation.

Thus, the operation of either fan switches 44 or 48 completes a circuit through the conductor 62, terminal 64 of terminal strip 22, and blower motor 18 to start the blower motor into operation. At the same time, the operation of either of the fan switches 44 or 48 completes a circuit from terminal 64 of terminal strip 22 through the thermistor 32 and the blower relay coil 74 of blower relay 28 back to the power conductor 36.

The operation of the negative temperature coefficient resistor 32 is well known in that its resistance decreases as a function of time and current flow through the resistance. Thus, the thermistor 32 serves as a time delay element in that immediately upon the operation of either of the fan switches 44 and 48 to start blower motor 18, the current through the blower motor coil 74 is insufficient to energize the blower relay. After the predetermined time delay effected by the operation of thermistor 32, the current through the blower motor coil 74 is sufficient to energize the coil and to close the blower motor contacts 76 which complete a circuit to the blower motor 20 of furnace unit 16. In this manner the two furnace units have their burners energized simultaneously in response to a heat demand from the single thermostat 12 but the blower motors 18 and 20 are turned on in a sequential fashion to prevent the power drain from becoming excessive.

Those skilled in the art will also appreciate that two sets of burner controls normally cannot be operated in parallel from a single thermostat without upsetting the heat anticipation feature of the thermostat. In accordance with a further feature of this invention, a resistance element 80 is connected in parallel with the heating relay coil 70 of heating relay 26, and this resistance element serves to adjust the current flow through the thermostat 12 to the value of heat anticipation current necessary so that a single standard thermostat may be used to coordinate the operation of the parallel connected burner controls with proper thermostat heat anticipation.

In accordance with a still further feature of this invention, a plurality of multiple interlock control circuits may be used to control the operation of three furnace units to the end that the burners of all furnace units may be operated under the control of a single thermostat while permitting the three burner motors associated with the furnace units to be turned on in a sequential manner.

A specific illustrative embodiment of this type of circuit is shown in FIGURE 2 of the drawing wherein elements similar to those described above have been given similar reference numerals. Thus, FIGURE 2 illustrates the two furnace units 14 and 16 described above to which has been added furnace unit 82. Furnace unit 82 is similar to furnace units 14 and 16 and comprises a transformer 84, a limit switch 86, a fan switch 88, and an automatic main control valve 90.

In the circuit of FIGURE 2 an additional multiple interlock control circuit 92 is utilized and is similar to the multiple interlock control circuit 10 in that it comprises a transformer 94, a heating relay 96, a blower relay 98, a thermistor 100, a low voltage terminal strip 102 and a high voltage terminal strip 104. The blower motor for furnace unit 82 is shown as motor 106. It can be seen from the circuit of FIGURE 2 that the transformer 84 of furnace unit 82 is connected in parallel with the transformers of the first two furnace units at one terminal thereof and at its other terminal transformer 84 is connected to the limit switch 86. Limit switch 86 is connected in parallel with the limit switches 42 and 46 of the first two furnace units, and the fan switch 88 is connected in parallel with the fan switches 44 and 48 of the first two furnace units. All three automatic main control valves are connected in parallel to terminals 58 and 60 of the low voltage terminal strip 24 in the multiple interlock control circuit 10 so that a heat demand from the single thermostat 12 results in the burners of all three furnace units being turned on simultaneously, in the manner described in detail above.

The multiple interlock control circuit 12 differs from the multiple interlock control circuit 10 in that the blower relay coil 110 and the thermistor 100 are connected in parallel with the blower motor 20 of the furnace unit 16. Thus, when blower motor 20 is turned on in its sequential manner, a predetermined period of time after blower motor 18 is turned on, current is supplied to the blower relay coil 110 and thermistor 100 of the multiple interlock control circuit 92. After a second time delay, determined by the operation of thermistor 100, the blow relay coil 110 is energized to close its contacts 112 to thereby complete the power circuit to blower motor 106.

It can now be appreciated that the circuit of FIGURE 2 enables the three furnace units 14, 16 and 82 respectively to have their burners energized simultaneously under control of the single thermostat 12 while at the same time causing the three blower motors 18, 20 and 100 to be turned on in a sequential fashion with a predetermined time delay between the operation of the successive blower motors.

One of the highly advantageous features of the circuit arrangement of FIGURE 2 is the ease in which the second multiple interlock control circuit may be connected to the first multiple interlock control circuit so that the third furnace unit may be added to the heating installation with merely a few simple wiring steps. Further, in the manner described above, a resistance element 114 may be connected in parallel with the coil of the heating relay 96 to adjust the current flow through the thermostat 12 to the proper value of heat anticipation current.

There has been shown and described several novel embodiments of the multiple interlock control circuits for coordinating the operation of a plurality of furnace units under the control of a single thermostat. It will be understood by those skilled in the art that modifications may be made in the construction, arrangement of parts, and operation of the above-described invention without departing from the real spirit and purpose of the invention, and that it is intended to cover by the appended claims any modified forms of structure or use of equivalents which reasonably may be used within their scope.

What is claimed as the invention is:

1. A multiple interlock control circuit for coordinating the operation of a plurality of furnace units comprising a pair of power terminals, a thermostat, a heating relay for switching the furnace units on or off, conductor means electrically connecting said heating relay, said power terminals and said thermostat in a circuit for causing said heating relay to be energized in response to a heat demand by said thermostat, a separate blower motor and fan control switch associated with each furnace unit, conductor means connecting the fan control switches in parallel with each other and in series with said power terminals and one blower motor, a delay circuit including a blower relay in series with a delay device connected in parallel with said one blower motor whereby operation of any fan control switch applies power concurrently to said one blower motor and to said delay circuit, and conductor means electrically interconnecting said blower relay, a second blower motor and said power terminals to cause said second blower motor to be energized a predetermined period of time after the energization of said one blower motor as determined by the time delay period of said delay device.

2. A multiple interlock control circuit in accordance with claim 1 wherein said delay device comprises a negative temperature coefficient resistance.

3. A multiple interlock control circuit in accordance with claim 1 further comprising resistance means connected in parallel with said heating relay to adjust the current flow through said thermostat to a desired value of heat anticipation current.

References Cited in the file of this patent
UNITED STATES PATENTS

| | | |
|---|---|---|
| 2,061,536 | Dillman | Nov. 17, 1936 |
| 2,096,626 | Crago | Oct. 19, 1937 |
| 2,140,389 | Lum | Dec. 13, 1938 |
| 2,210,852 | Falkenberg | Aug. 6, 1940 |
| 2,679,623 | Wyman | May 25, 1954 |
| 2,835,448 | Page | May 20, 1958 |

OTHER REFERENCES

"Relay Engineering" (Packard), published by Struthers-Dunn, Inc. (Philadelphia), 1945 (pages 316 and 317 relied on).